(12) United States Patent
Khan et al.

(10) Patent No.: US 9,148,287 B2
(45) Date of Patent: Sep. 29, 2015

(54) PRIORITISATION OF CHARGING IN AN IMS NETWORK

(75) Inventors: David Khan, Bromma (SE); Anders Baer, Årsta (SE); Tobias Austrell, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 217 days.

(21) Appl. No.: 13/470,642

(22) Filed: May 14, 2012

(65) Prior Publication Data

US 2012/0295585 A1 Nov. 22, 2012

Related U.S. Application Data

(60) Provisional application No. 61/487,417, filed on May 18, 2011.

(30) Foreign Application Priority Data

May 17, 2011 (EP) .................................... 11166303

(51) Int. Cl.
*H04M 11/00* (2006.01)
*H04L 12/14* (2006.01)
*H04L 29/06* (2006.01)

(52) U.S. Cl.
CPC ............ *H04L 12/14* (2013.01); *H04L 12/1425* (2013.01); *H04L 65/105* (2013.01); *H04L 65/1006* (2013.01); *H04L 65/1016* (2013.01); *H04L 65/1043* (2013.01); *H04L 65/1063* (2013.01); *H04L 65/1069* (2013.01)

(58) Field of Classification Search
CPC ..... H04W 4/24; H04L 12/14; H04L 12/1425; H04L 65/105; H04L 65/1069; H04L 65/1043; H04L 65/1016; H04L 65/1063; H04L 65/1006
USPC .................................................. 455/406–409
See application file for complete search history.

(56) References Cited

U.S. PATENT DOCUMENTS

| 2006/0003734 | A1* | 1/2006 | Vallinen et al. | 455/406 |
| 2009/0253405 | A1 | 10/2009 | Yang | |
| 2011/0317558 | A1* | 12/2011 | Siddam et al. | 370/235 |

FOREIGN PATENT DOCUMENTS

| EP | 1686752 A1 | 8/2006 |
| EP | 1746772 A1 | 1/2007 |
| WO | WO 2011/010320 A1 | 1/2011 |

OTHER PUBLICATIONS

Nokia Siemens Networks; "Correction on priority session treatment;" 3GPP Draft; S5-093782 R9 CR 32 299; 3rd Generation Partnership Project (3GPP); Mobile Competence Centre; 650, Route des Lucioles; F-06921 Sophia-Antipolis Cedex; France; Nov. 9, 2009.

(Continued)

*Primary Examiner* — Marcos Torres

(57) ABSTRACT

One aspect provides a method of storing charging data in an IMS network. A message is received at a network entity. A charging priority value of the message relating to charging data associated with the message id identified. The charging priority value is included in a charging request message and the charging request message is forwarded to a charging control system. Other aspects provide IMS network entities configured to implement the method.

18 Claims, 6 Drawing Sheets

(56) References Cited

OTHER PUBLICATIONS

3GPP TS 24.229 v10.2.0 (Dec. 2010); 3$^{rd}$ Generation Partnership Project; Technical Specification Group Core Network and Terminals; IP multimedia call control protocol based on Session Initiation Protocol (SIP) and Session Description Protocol (SDP); Stage 3 (Release 10).

3GPP TS 32.260 v10.2.0 (Dec. 2010); 3rd Generation Partnership Project; Technical Specification Group Services and System Aspects; Telecommunication management; Charging management; IP Multimedia Subsystem (IMS) charging (Release 10).

* cited by examiner

PRIORITISATION OF CHARGING IN AN IMS NETWORK

RELATED APPLICATIONS

This application claims the benefit of European patent application number 11166303.5 filed on May 17, 2011, and U.S. provisional application No. 61/487,417 filed on May 18, 2011, the disclosure of which is fully incorporated herein by reference.

TECHNICAL FIELD

The present invention relates to a method in an IP Multimedia Subsystem network of prioritising charging information, and to network entities or nodes in the network configured for application of the method.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. The IMS is defined in the 3GPP Specification 23.228.

FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber; and the Interrogating CSCF (I-CSCF) whose role is to identify the correct S-CSCF and to forward to that S-CSCF a request received from a SIP terminal via a P-CSCF. Within the IMS service network, Application Servers (ASs) are provided for implementing IMS service functionality and to provide services to end users.

The S-CSCF is the central node of the signaling plane. It is a SIP server, but performs session control as well. It uses Diameter Cx and Dx interfaces to download and upload user profiles to/from the user's Home Subscriber Server HSS). The S-CSCF handles SIP registrations, and is in the path of all signaling messages, so that it can inspect every message in a session. It decides to which application server(s) the SIP message will be forwarded for the provision of services and it provides routing services.

According to the principles outlined in the 3GPP technical specifications, [TS 32.260] and [TS 32.299] the S-CSCF also acts as a Charging Triggering Function (CTF) with regard to charging of users of the IMS infrastructure and services. Note, however, that although the discussion herein is based around the S-CSCF acting as the CTF, the principles described would be equally applicable to any IMS network node acting as the CTF.

Acting as the CTF in an IMS network requires the S-CSCF to perform a number of tasks in order to identify the correct charging signalling to apply that corresponds to, and is triggered by the user's session activity. The S-CSCF, when performing its normal routing actions for the SIP signalling events that it is handling, determines whether the SIP information represents a chargeable activity, and then which type of charging mechanism to apply. The charging mechanisms for IMS sessions are either Offline (post-paid) charging, using accounting messages, or online (pre-paid) charging, using credit control messages and procedures.

Information about IMS transactions is sent from the S-CSCF (or other IMS nodes) to a charging node that collects this information and stores it in the form of Charging Data Records (CDRs), which can then be used in whatever way the operator sees fit. The information collected in this way is categorized as charging information, but in fact it can be information relating to things other than charging (billing), such as a form of Deep Packet Inspection (DPI), statistics, security, traffic monitoring, etc.

FIGS. 2a and 2b illustrate the IMS architecture for offline and online charging respectively. As shown in FIG. 2a, for off-line charging the various IMS network entities that handle transactions, and might act as a CTF to generate charging information, communicate with a Charging Data Function (CDF) 20 over an Rf interface. The entities shown include: Breakout Gateway Control Function (BGCF) 22a, Media Gateway Control Function (MGCF) 22b, Media resource Function Controller (MRFC) 22c, SIP Application Server (AS) 22d, Proxy-CSCF (P-CSCF) 22e, Interrogating-CSCF (I-CSCF) 22f, and Serving-CSCF (S-CSCF) 22g. The CDF 20 communicates with a Charging Gateway Function (CGF) 24 over the Ga interface, which in turn communicates with the IMS billing domain 26 over the Bi interface.

As shown in FIG. 2b, for on-line charging, the IMS network entities 22a-22e communicate with an Online Charging System (OCS) 28, over the Ro interface. In the figure, for clarity, only the communications over the Ro interface between the MRFC 22c, SIP-AS 22d and S-CSCF 22g are shown although any network entity that handles or generates charging information that should be passed to the OCS 28 may act as a CTF and pass data over the Ro interface, including any of the other entities 22a-22g shown. The OCS 28 communicates directly with the IMS billing domain 26. In the case of the S-CSCF 22g, the charge-triggering information is sent via an IMS Gateway Function (IMS-GWF) 29 over the ISC interface and then over the Ro interface to the OCS 28.

As explained above, although the discussion below focuses on the S-CSCF, the same principles may be applied to any IMS node that acts as a CTF, including any of those listed above and shown in FIGS. 2a and 2b.

FIG. 3 illustrates the signalling involved when a user entity, UE 30, initially registers with the IMS, in accordance with the procedure set out in 3GPP TS 24.229. On receiving an initial registration request 301 from a UE 30, a serving CSCF 32 sends a User Authorisation Request, UAR 302, to the users Home Subscriber Server, HSS 34, which returns a User Authorisation Answer, UAA 303. The CSCF 32 then sends a Media Authorisation Request, MAR 304 to the HSS 34, which returns a Media Authorisation Answer, MAA 305. The CSCF 23 then returns a 401 Unauthorised message 306 to the UE 30, which prompts the UE 30 to send a second Register request 307, and the procedure of exchanging UAR and UAA is repeated at 308 and 309. The CSCF 32 then sends a Server Assign Request 310 to the HSS 34, which returns a Server Assign Answer, SAA 311. The user profile information is passed to the serving CSCF 32 in the SAA message 311. Finally, the CSCF 32 sends a 200 OK message 312 to the UE 30 to indicate successful registration.

FIGS. 4a and 4b illustrate the signalling involved between, on one side a UE or an Application Server 40, and on the other side the IMS charging control system 44, via the S-CSCF 42, for, respectively, off-line and on-line charging. During IMS calls, charging-related information is passed from the S-CSCF 42 to the charging control system (e.g. CDF or OCS as shown in FIGS. 2a and 2b) in order to construct CDRs. To pass the charging related information, offline charging uses the DIAMETER Accounting Request, ACR and Answer ACA messages, and online charging uses the DIAMETER Credit Control Request, CCR, and Answer, CCA, messages. The charging related information is passed in Attribute-Value Pairs (AVPs) within the ACR and CCR messages.

For off-line charging, as shown in FIG. 4a, a session is set up through the exchange of SIP INVITE and SIP 200 OK messages with a receiving peer (not shown) as indicated at 401-404. Once the session has been established, the S-CSCF 42 sends an Accounting Request, ACR, message 405 to the charging control system 44 (e.g. the CDF as shown in FIG. 2a), together with the charging-related information relating to the start of the session and the user identity and service information. The charging control 44 returns an Accounting Answer 406. When the session ends, as indicated by the sending of SIP BYE messages 407, 408, the S-CSCF 42 sends a further ACR 409 to the charging control system 44, together with the required information relating to the ending of the session, user identity and service information. The charging control system 44 returns an ACA message 410. The charging control system 44 creates CDRs using the information in the ACR messages 405, 409.

For on-line charging, as shown in FIG. 4b, when the UE/AS 42 sends the initial SIP INVITE message 411, the S-CSCF 42 immediately sends a Credit Control Request, CCR 412 to the charging control system (e.g. the OCS as shown in FIG. 2b). The CCR includes an indication that it is an initial credit control request and also provides a user identity and service information. Now the charging control performs a credit determination 412a of a number of service units that the user will initially be granted for the session, assuming the user has sufficient pre-paid credit. This information is provided back to the S-CSCF 42 in a Credit Control Answer, CCA 413. Now the S-CSCF can forward on the SIP Invite 414 to the receiving peer, and the session can be established as before with the return of SIP 200Ok messages 415, 416. While the session is in progress, the S-CSCF may send a CCR Update 417, for example to request grant of more service units if the initially granted service units are about to run out. The charging control system then performs another credit determination 417a and provided the user has sufficient credit, the charging control 44 grants additional service units by way of a CCA 418. At termination of the session, when the S-CSCF 42 receives a SIP BYE message 419, it sends a CCR 420 to the charging control 44 indicating termination and including the user identity, service units consumed and service information. The charging control system 44 then uses this information to calculate 420a an amount to debit the user, and returns a CCA message 421.

The above-described mechanisms deal with the mechanics of handling the data required for charging users, but provide no means of controlling charging for the system providers/operators. For example, different ACRs/CCRs may have different values to an operator based on the revenue that these provide. One user could generate a lot more revenue compared to another user, which makes the first user's ACR/CCRs more valuable to the operator. It is also common practice for internal calls within one operator's network to be charged at a flat rate or for free, which makes those ACR/CCRs less valuable.

The problem becomes more acute in the event of a system overload or a link failure between the CTF and the charging system. In such cases the CTF starts to write the ACR/CCRs to a local storage, such as a disk. If the situation persists the disk can quickly become full and in that case either new ACR/CCRs will be discarded, or will overwrite previously stored ACR/CCRs. This means that a less valuable ACR/CCR may be stored while a more valuable ACR/CCR is discarded or over-written, with the result that the operator will lose revenue. An overload situation could also arise in the charging system itself giving rise to a similar problem.

There are also situations where it would be desirable for the CTF to connect to different Charging systems for ACR/CCRs that have a higher value. For example, the operator might want to handle the more valuable ACR/CCRs in a specific charging system having higher security and more redundancy.

The present invention has been conceived with the foregoing problems in mind.

SUMMARY

One aspect provides a method of storing charging data in an IMS network. A message is received at a network entity. A charging priority value of the message relating to charging data associated with the message id identified. The charging priority value is included in a charging request message and the charging request message is forwarded to a charging control system.

The method may further comprise, prior to receiving the message, receiving a registration request from a user, assigning a charging priority value to the user and forwarding the assigned priority value to network entities serving the user.

The method may further comprise detecting at the IMS network entity that the charging control system is unable to receive charging data, and storing the associated charging data.

If the charging data is to be stored on a storage medium, then if a capacity limit of the storage medium is reached, the charging data may over-write data already stored on the storage medium that has a lower charging priority value.

The method may further comprise downloading priority value data for messages associated with a user when the user registers with the IMS. The priority value data may be downloaded from the users HSS as part of the user profile.

The priority value data may comprise different priority values for different types of messages.

The method may further comprise identifying one of a plurality of charging control systems to which the charging data is to be sent based on the priority value, the charging request message being forwarded to the identified charging control system.

Another aspect provides an IMS network entity configured to identify a charging priority value relating to charging data associated with an IMS messaging transaction, and to include the charging priority value in a charging request message sent to a charging control system in the IMS network.

The charging priority value may be a predetermined value related to a user of the messaging transaction that is stored in the network entity when the user registers with the IMS network. The charging priority value may be a predetermined value stored in the network entity based on a property or type of message of the messaging transaction.

The IMS network entity may be further configured to detect that the charging system in the network is unable to receive charging data, and to store the charging data on a storage medium. If the data stored in the storage medium reaches a capacity limit of the storage medium, the charging data may over-write data already stored on the storage medium that has a lower charging priority value.

The IMS network entity may be further configured to identify one of a plurality of charging control systems to which the charging data is to be sent based on the priority value, and to forward the charging request message to the identified charging control system.

The IMS network entity may be one of: a CSCF, a BGCF, a MGCF, a MRFC and an AS.

Another aspect provides an IMS network entity configured to identify a charging priority value in respect of a user registering with the IMS network, and to provide the charging priority value to one or more other network nodes serving the user.

DETAILED DESCRIPTION

As explained in the background discussion above, some users can generate more money for an operator than other users. Therefore some ACRs and CCRs are more important than others in that those ACRs will generate more revenue for the operator. For example, on the one hand, some users make a lot of international calls, some users pay higher rates per call or pay more for using certain services. On the other hand, calls within an operator's network could be free of charge or charged at a single flat rate, meaning those ACRs have a lower value.

Currently, in accordance the Standards it is not possible to differentiate between ACR/CCRs or to prioritise a specific ACR or CCR. The embodiments described herein introduce a Charging priority ID that provides a value for the ACR/CCRs to allow such a differentiation or prioritisation. This enables, for example, a CSCF/CTF which is having to locally store charging data as a result of a link failure or overload condition, to start to overwrite ACR/CCRs that have a lower priority with ones having higher priority. This means that the operator can secure more revenue from the locally stored ACRs.

The basic concept may be implemented by including a charging priority ID in the charging AVPs of the DIAMETER ACRs and CCRs. The charging priority ID may be provided for each user and transferred over the Cx interface to the CSCF during registration, or over the Sh interface for CTFs that are not using Cx.

Figure 3:
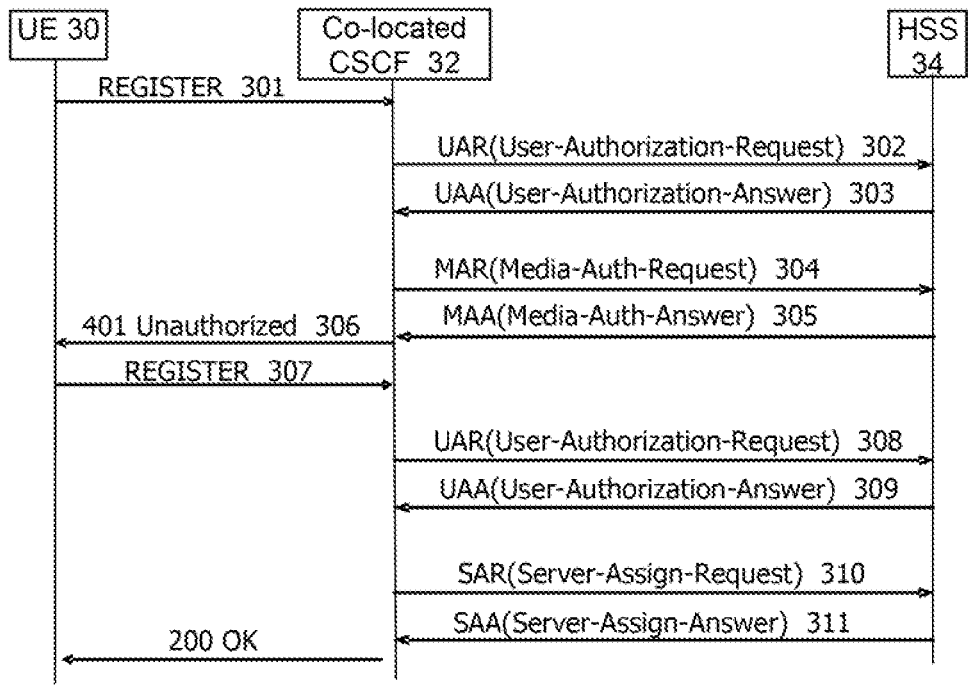
FIG. 3 is a signal diagram illustrating the signalling involved when a UE initially registers with the IMS, in accordance with current standards.
Figure 5:
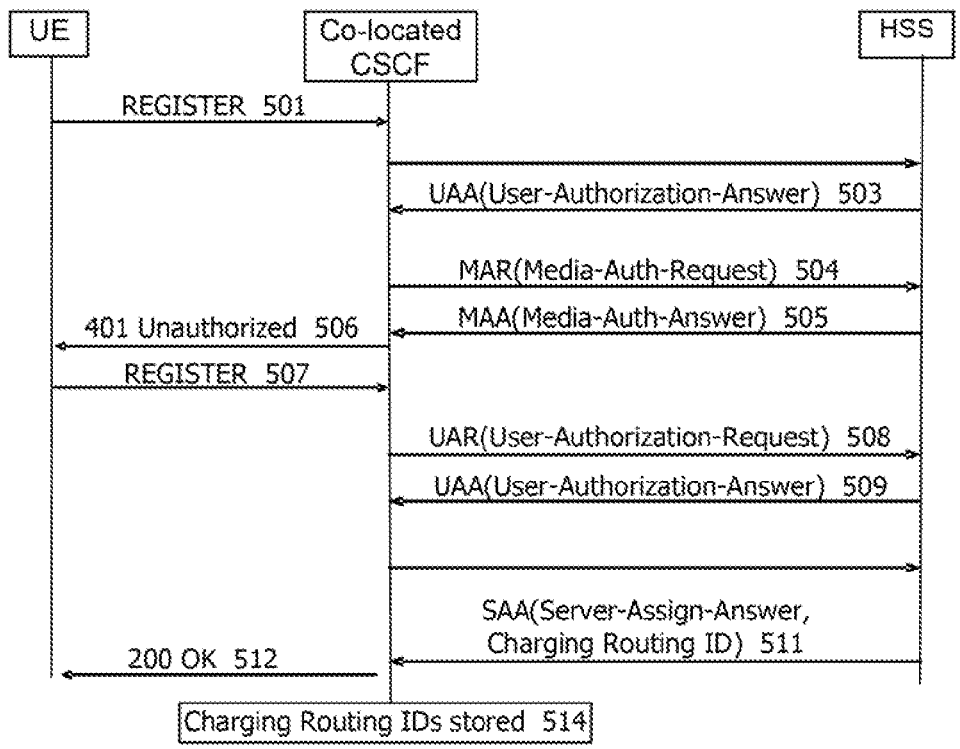
FIG. 5 is a signal diagram illustrating the signalling involved when a UE initially registers with the IMS, in accordance with one embodiment.

Referring to FIG. 5, this shows the same signalling procedure as described above with reference to FIG. 3 where a UE registers with the IMS, but with the inclusion of the charging priority ID. On receiving an initial registration request 501 from a UE 50, the signals 502 to 510 between the UE 50, CSCF 52 and the user's HSS 54 are the same as signals 302-310 of FIG. 3. When the CSCF 52 has sent a SAR 510 to the HSS 54, The HSS returns a SAA 511 as before, except that this time it includes a charging priority ID together with the user profile information passed to the CSCF 52. The CSCF 52 sends a 200 OK message 512 to the UE 50 to indicate successful registration, and then stores the charging priority ID, as shown at 514. The Charging priority ID that the HSS 54 provides may be derived from information used to categorize users, which in turn could be derived from an operator's user statistics.

Figure 4A:
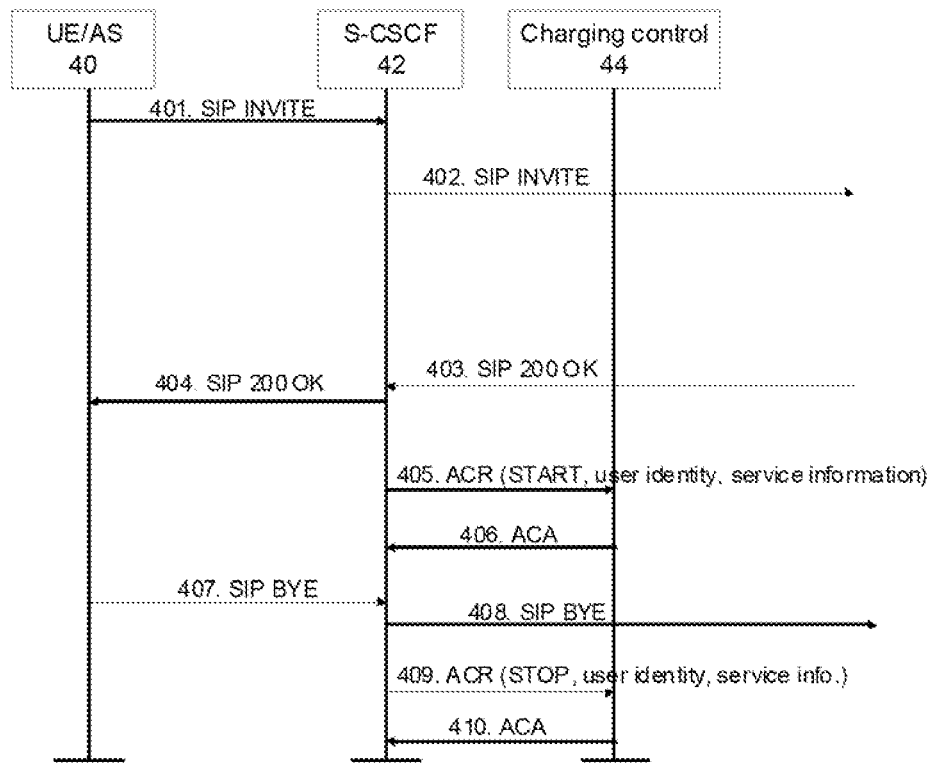
FIGS. 4a and 4b are signalling diagrams illustrating the signalling involved for, respectively, off-line and on-line charging in the IMS, in accordance with current practice.
Figure 6A:
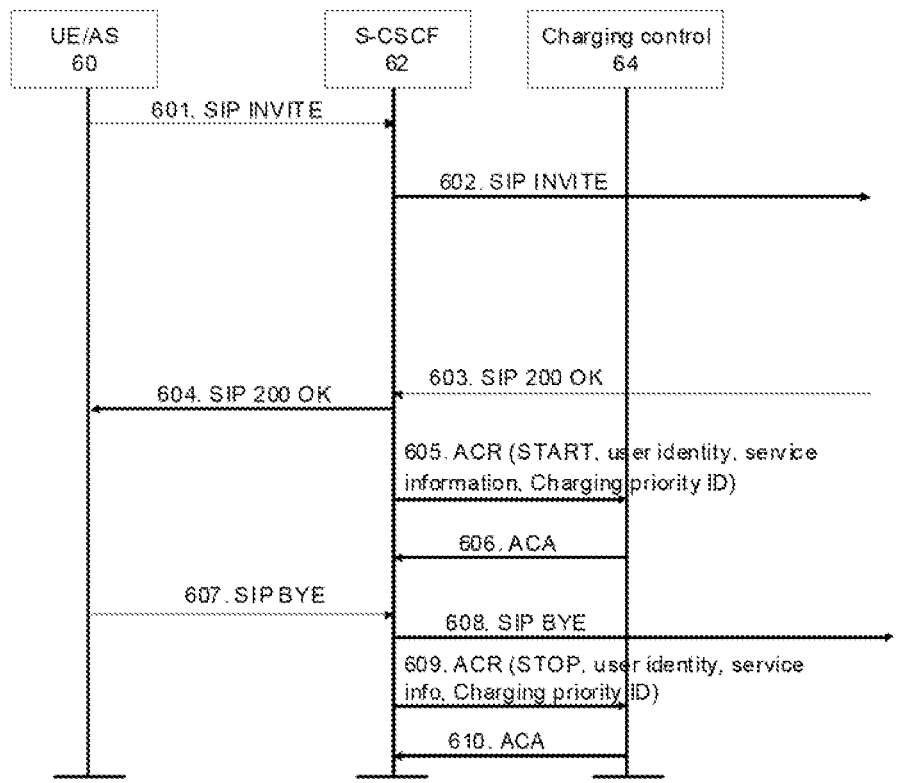
FIG. 6 is a signalling diagram illustrating the signalling involved for off-line charging in the IMS, in accordance with one embodiment.

Use of the charging priority ID is described with reference to FIG. 6 for the case of off-line charging. The procedure essentially follows that described above with reference to FIG. 4a. Thus the initial session set-up signals 601 to 604 are the same as 401 to 404 in FIG. 4a. Once the session has been established, the S-CSCF 62 sends an ACR message 605 to the charging control system 64 together with the charging-related information relating to the start of the session and the user identity and service information. However, it also includes the charging priority ID, which the charging control system can then use to prioritise the relative importance of the charging information. For example, if the charging priority ID indicates a high priority, then the charging control system can take appropriate action to ensure that the charging data is captured and stored, if necessary over-writing lower priority data. The charging control 44 then returns an Accounting Answer 606.

When the session ends, as indicated by the sending of SIP BYE messages 607, 608, the S-CSCF 62 sends a further ACR 609 to the charging control system 64, together with the required information relating to the ending of the session, user identity and service information. This ACR 609 also includes the charging priority ID so that the charging control system 64 can know how important, or valuable the data is. Finally, as before, the charging control system 64 returns an ACA message 610.

Figure 4B:
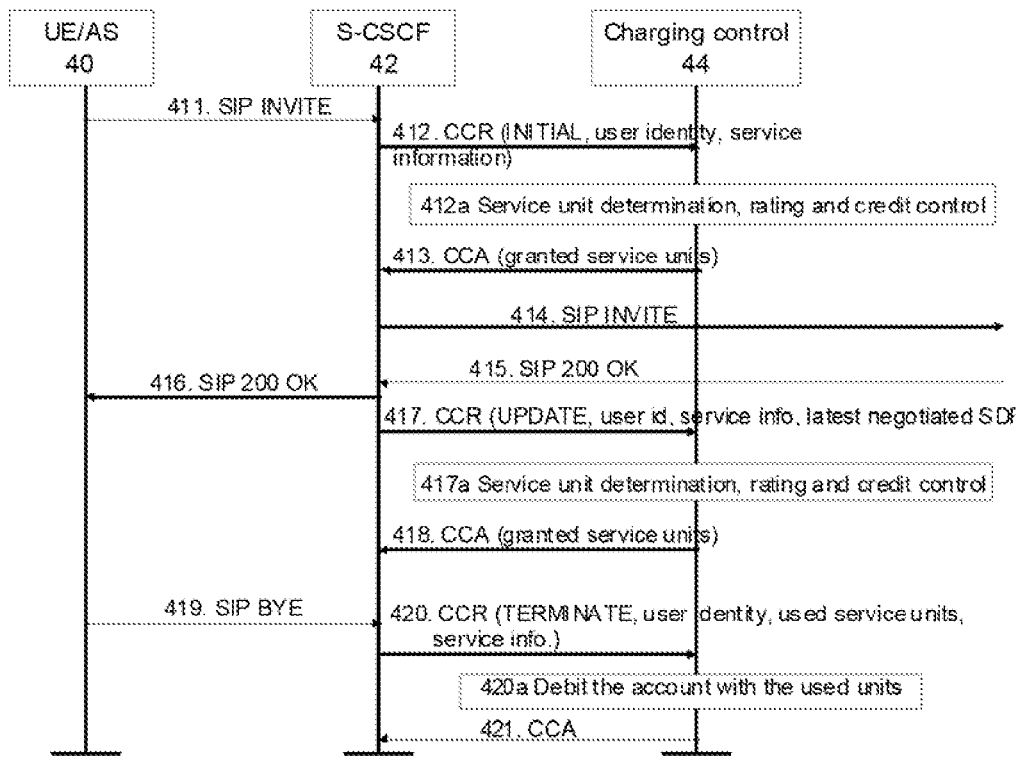
Figure 6B:
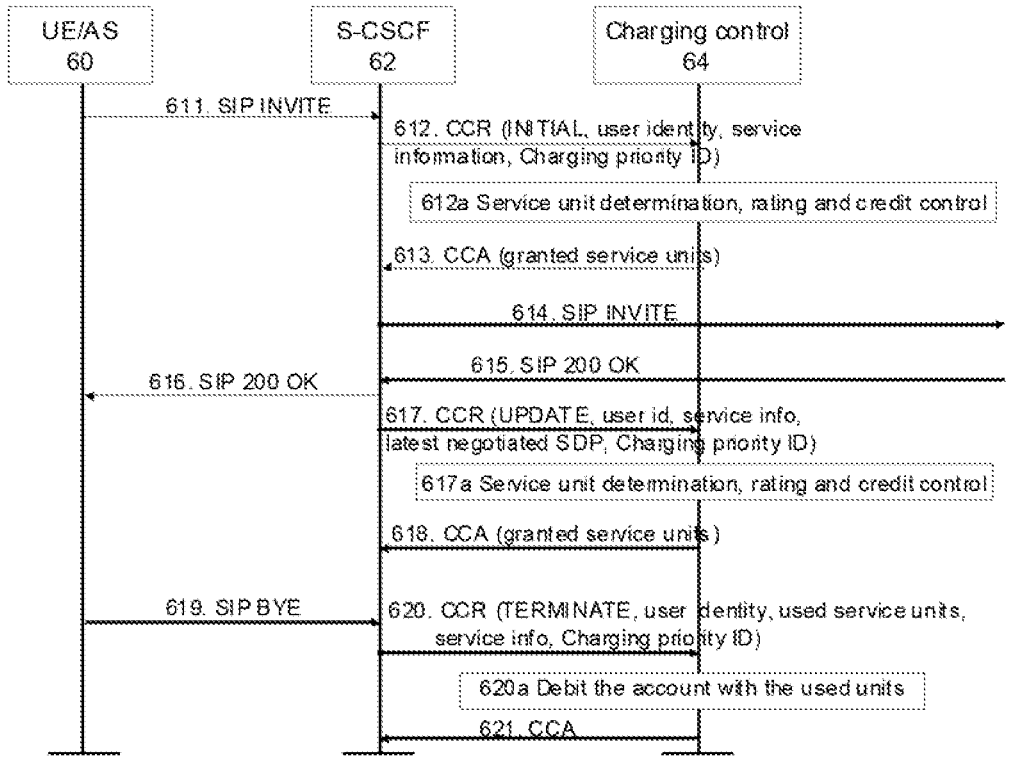

The same principles can be applied to the on-line charging procedure, where the charging priority ID is included in the CCR messages, CCR INITIAL, CCR UPDATE and CCR TERMINATE as shown at 412, 417 and 420 in FIG. 4b. This is shown in FIG. 6b, wherein steps 611 to 621 correspond to steps 411 to 421 of FIG. 4b, except that in the CCR messages 612, 617 and 620, in addition to the information provided in the process of FIG. 4b, the Charging priority ID is also provided by the S-CSCF 62 to the charging control 64.

Figure 7:
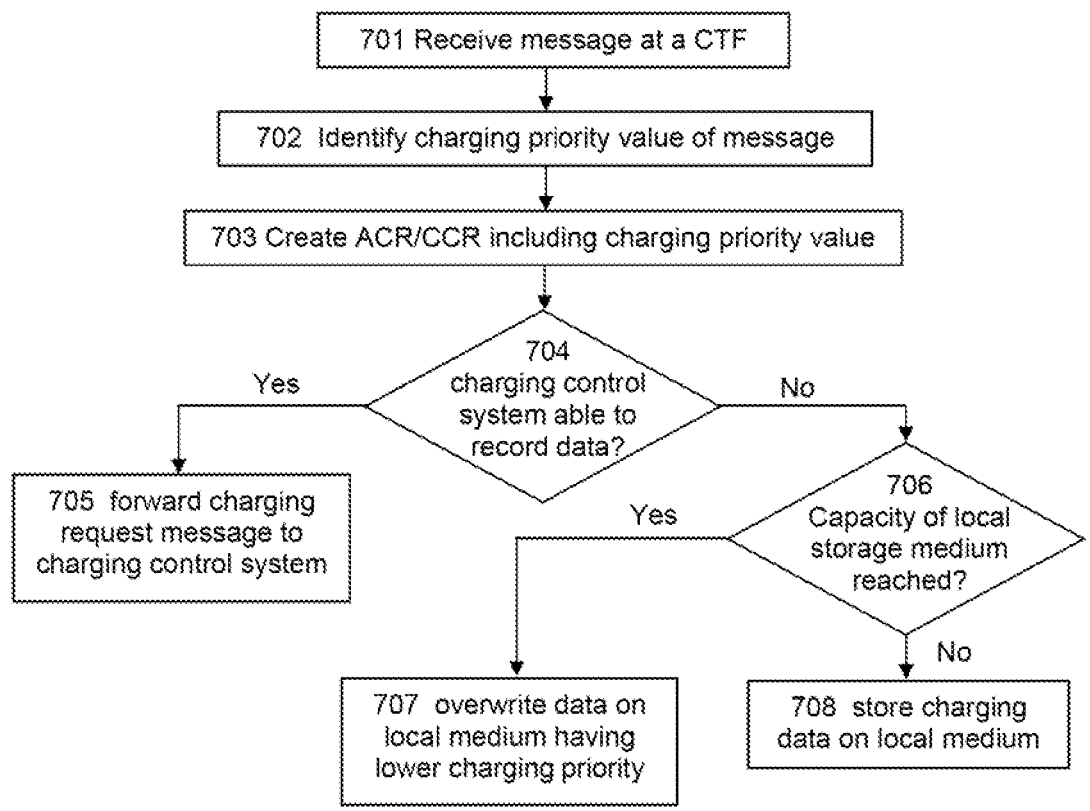
FIG. 7 is a flow diagram illustrating the principal method steps in accordance with one embodiment.

FIG. 7 illustrates how the principles described above may be implemented by way of method steps in a flow diagram. At step 701, a CTF network entity, such as a CSCF, receives a message relating to a user session. The message is one that the CTF entity recognises as relating to a charging event that triggers an ACR or CCR. At step 702 the network entity identifies the charging priority value associated with the message. The Charging Priority ID may have been sent to the CTF entity and stored locally when the user registered. At step 703, the CTF entity creates an ACR or CCR and includes with it a Charging Priority value. This value could simply be the user's Charging Priority ID itself, in which case it would be left to the charging control system to determine how the charging data in the ACR/CCR should be dealt with. Alternatively, the network entity may be configured to evaluate a charging priority value based on the user's Charging Priority ID and other information related to the nature of the received message that triggered the charging event. For example, the charging priority value could depend on the traffic case, destination of the message, or type of customer.

Further, the method depicted by FIG. 7 also deals with the situation where the charging control system is unable to record data (for example because a link to the system is down). Thus at step 704 the CTF entity determines if the charging control system is able to record the charging data, and if it is, at step 705 forwards the ACR/CCR. If not, then it will attempt to record the charging data at a local storage medium. A step 706 it determines if the capacity of the local storage medium has been reached. If it has, then at step 707 it will overwrite data on the local storage medium that has a lower charging priority value (e.g. the lowest priority value data stored). Otherwise, at step 708 it simply forwards the charging data for storage.

Figure 1:
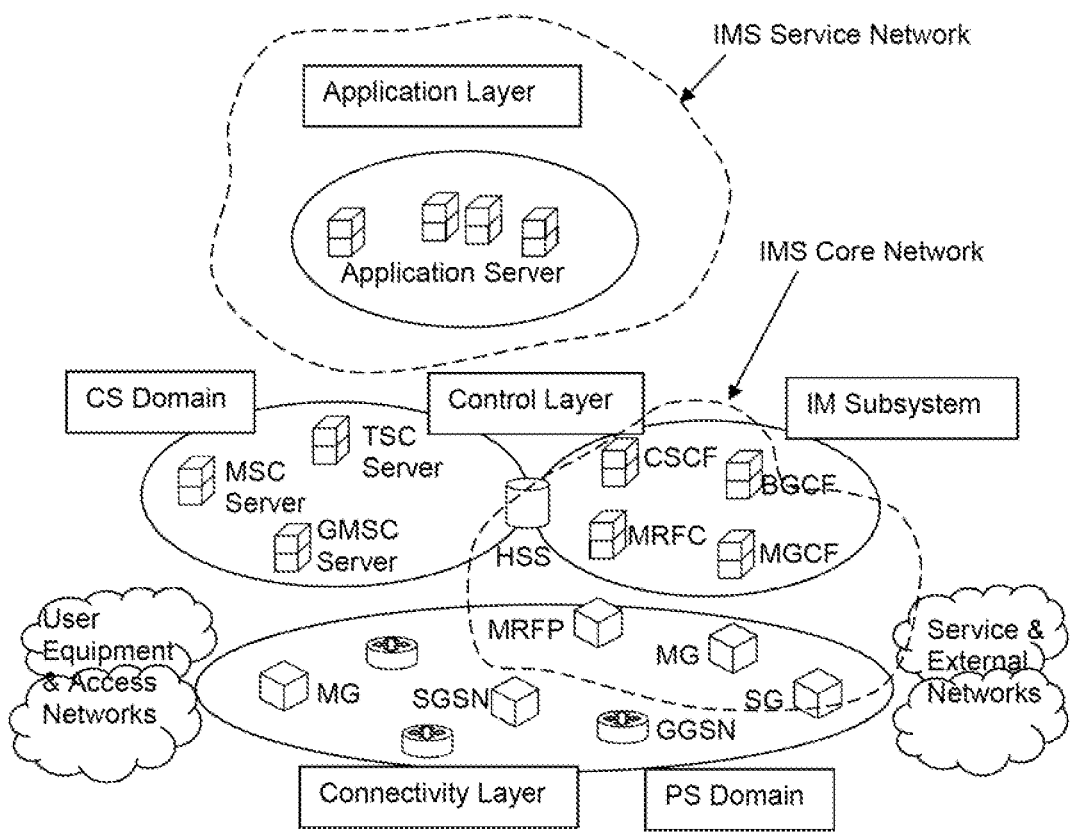
FIG. 1 illustrates schematically the integration of an IP Multimedia Subsystem into a 3 G mobile communications system.
Figure 2A:
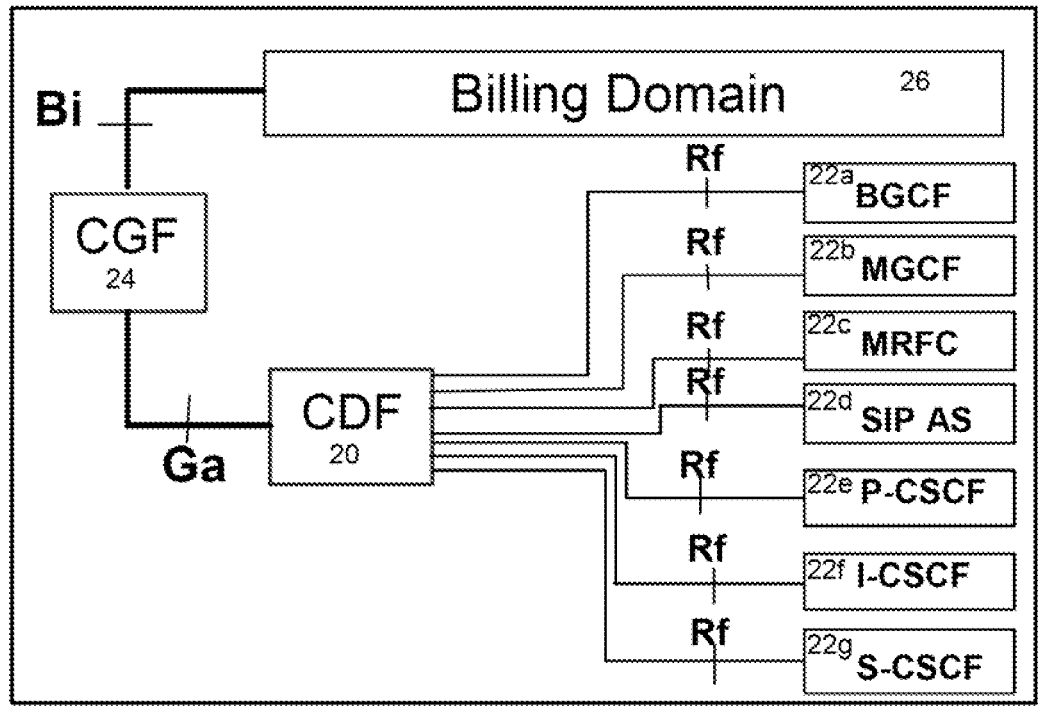
FIGS. 2a and 2b are schematic illustrations showing the IMS architecture for offline and online charging respectively.
Figure 2B:
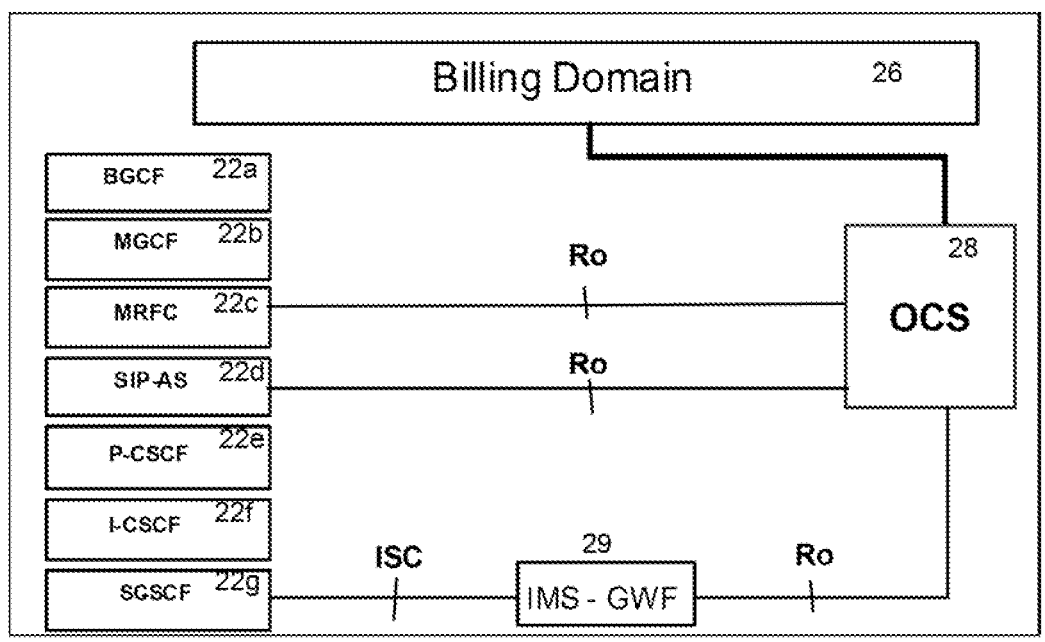

The process depicted in FIG. 7 at steps 704 and 706-708 may not be applicable for on-line charging and the sending of CCR messages. This is because, as shown at step 612 in FIG. 6b, as soon as the S-CSCF 62 receives a SIP INVITE from the UE 60 it immediately sends a CCR to the charging control system 64. If the charging control system 64 was not reachable, it would not return a CCA 613, and so the S-CSCF would not proceed at step 614 to forward the SIP INVITE and the session would not be established. However, a similar situation could arise within the charging system 64, wherein the CCR message is unable to be forwarded. For example, referring to FIG. 2, the OCS 28 may be unable to forward the data to the Billing Domain 26. In that case the OCS 28 may itself be configured to buffer the charging data, and the same principles may be employed whereby the Charging priority ID is used to determine which is the most valuable charging data to be buffered, if necessary over-writing data having a lower priority.

From the above it can be seen that by introducing a charging priority ID the most important, or valuable charging data will always be recorded. The charging priority ID can also be used by the network operator to handle the charging data contained in an ACR or CCR in any particular way that the operator chooses—for example to maximise revenue. The Charging priority ID can be configured at the CTF/CSCF level and used to determine a charging priority value that could depend, for example, on the traffic case, or destination. The charging priority value could be based solely on a user level defined in the HSS, depending on the priority that to operator sets for a specific user. Alternatively, it could be based on a combination of such parameters. The operator has full flexibility to set the priority based on what is most important from the operator's perspective.

The invention claimed is:

1. A method of storing charging data in an IP Multimedia Services (IMS) network, the method comprising:
   receiving a message at a network entity;
   identifying a charging priority value of the message;
   including the charging priority value in a charging request message;
   forwarding the charging request message to a charging control system;
   differentiating charging data corresponding to the message with respect to other charging data corresponding to other messages, the differentiation being at least partially based on the charging priority value of the message; and
   using the charging data corresponding to the charging request message in the charging control system to calculate an amount to debit a user associated with the charging request message,
   wherein the differentiation of charging data at least partially based on the charging priority value affects handling of at least one of:
      storage of the charging data, and
      selection of one of a plurality of charging control systems to which the charging request message is forwarded.

2. The method of claim 1 further comprising, prior to receiving the message:
   receiving a registration request from a user;
   assigning a charging priority value to the user; and
   forwarding the assigned priority value to network entities serving the user.

3. The method of claim 1 further comprising detecting at the IMS network entity that the charging control system is unable to receive charging data and storing the associated charging data.

4. The method of claim 1, wherein if the charging data is to be stored on a storage medium, then if a capacity limit of the storage medium is reached, the charging data over-writes data already stored on the storage medium that has a lower charging priority value.

5. The method of any of claim 1, further comprising downloading priority value data for messages associated with a user when the user registers with the IMS.

6. The method of claim 5 wherein the priority value data is downloaded from the user's Home Subscriber Server (HSS) as part of the user profile.

7. The method of claim 1, wherein the priority value data comprises different priority values for different types of messages.

8. The method of claim 1, further comprising identifying one of the plurality of charging control systems to which the charging data is to be sent based on the priority value, and wherein the charging request message is forwarded to the identified charging control system.

9. An IP Multimedia Services (IMS) network entity comprising:
   a processor; and
   memory containing instructions that, when executed by the processor, cause the IMS network entity to identify a charging priority value for an IMS messaging transaction, and to include the charging priority value in a charging request message sent to a charging control system in the IMS network,
   wherein the charging priority value is used to differentiate prioritize charging data corresponding to the messaging transaction with respect to other charging data corresponding to other messaging transactions,
   wherein the charging data corresponding to the charging request message is used by the charging control system to calculate an amount to debit a user associated with the charging request message, and
   wherein the differentiation of charging data at least partially based on the charging priority value affects handling of at least one of:
      storage of the charging data, and
      selection of one of a plurality of charging control systems to which the charging request message is forwarded.

10. The IMS network entity of claim 9 wherein the charging priority value is a predetermined value related to a user of the messaging transaction that is stored in the network entity when the user registers with the IMS network.

11. The IMS network entity of claim 9 wherein the charging priority value is a predetermined value stored in the network entity based on a property or type of message of the messaging transaction.

12. The IMS network entity of claim 9 further configured to detect that the charging system in the network is unable to receive charging data, and to store the charging data on a storage medium, wherein if the data stored in the storage medium reaches a capacity limit of the storage medium, the charging data over-writes data already stored on the storage medium that has a lower charging priority value.

13. The IMS network entity of claim 9, further configured to identify one of the plurality of charging control systems to which the charging data is to be sent based on the priority value, and to forward the charging request message to the identified charging control system.

14. The IMS network entity of claim 9, wherein the entity is one of: a Call/Session Control Function (CSCF), a Breakout Gateway Control Function (BGCF), a Media Gateway Control Function (MGCF), a Media Resource Function Controller (MRFC) and an Application Server (AS).

15. An IP Multimedia Services (IMS) network entity comprising:
   a processor; and
   memory containing instructions that, when executed by the processor, cause the IMS network entity to identify a charging priority value in respect of a user registering with the IMS network, and to provide the charging priority value to one or more other network nodes serving the user,
   wherein the charging priority value is used to differentiate charging data corresponding to a charging request message associated with the user with respect to other charging data corresponding to other charging request messages,
   wherein the charging request message is used by the charging control system to calculate an amount to debit the user, and
   wherein the differentiation of charging data at least partially based on the charging priority value affects handling of at least one of:
      storage of the charging data, and
      selection of one of a plurality of charging control systems to which the charging request message is forwarded.

16. The IMS network node of claim 15 wherein the network entity is a Home Subscriber Server (HSS) of the user.

17. The method of claim 1, wherein the charging request message is one of an accounting request (ACR) message and a credit control request (CCR) message.

18. The IMS network node of claim 9, wherein the charging request message is one of an accounting request (ACR) message and a credit control request (CCR) message.

* * * * *